E. R. DRAVER.
COMBINED TIRE CARRIER AND COVER.
APPLICATION FILED JULY 10, 1915.

1,182,994.

Patented May 16, 1916.
2 SHEETS—SHEET 1.

Witnesses
E. C. Skinkle
H. D. Kilgore

Inventor
E. R. Draver
By his Attorneys
Williamson & Merchant

E. R. DRAVER.
COMBINED TIRE CARRIER AND COVER.
APPLICATION FILED JULY 10, 1915.
1,182,994.
Patented May 16, 1916.
2 SHEETS—SHEET 2.
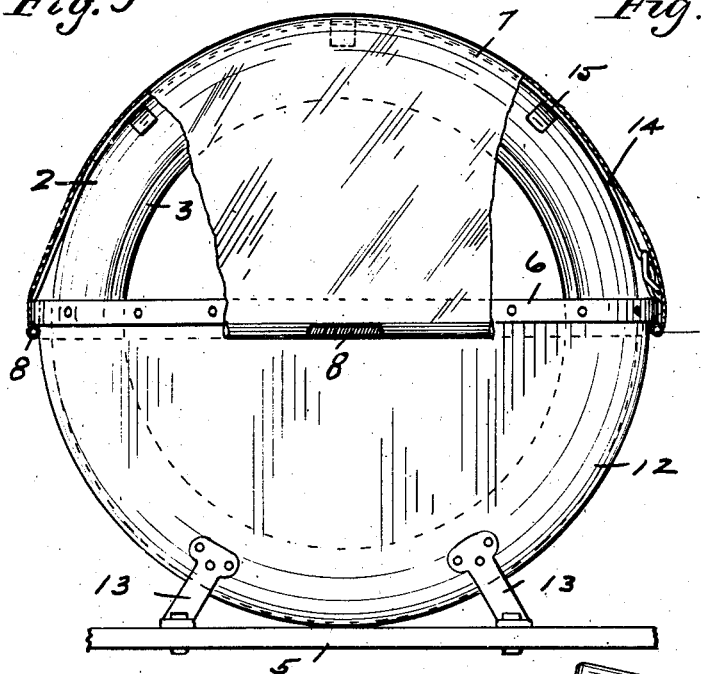
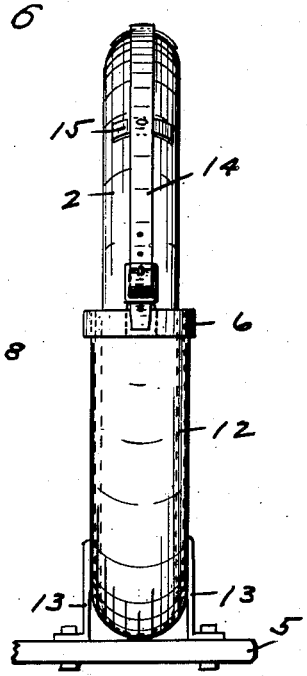
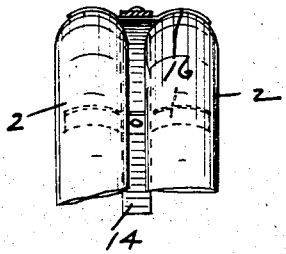
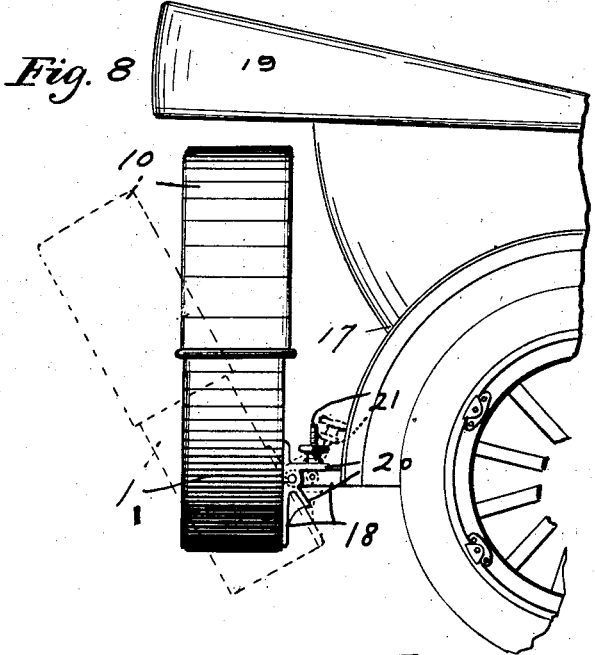
Witnesses
E. C. Skinkle
H. D. Kilgore
Inventor
E. R. Draver
By his Attorneys
Williamson & Merchant

UNITED STATES PATENT OFFICE.

EMIL R. DRAVER, OF RICHMOND, INDIANA.

COMBINED TIRE CARRIER AND COVER.

1,182,994.

Specification of Letters Patent. Patented May 16, 1916.

Application filed July 10, 1915. Serial No. 39,146.

*To all whom it may concern:*

Be it known that I, EMIL R. DRAVER, a citizen of the United States, residing at Richmond, in the county of Wayne and State of Indiana, have invented certain new and useful Improvements in Combined Tire Carriers and Covers; and I do hereby declare the following to be a full, clear, and exact description of the invention, such as will enable others skilled in the art to which it appertains to make and use the same.

My invention has for its object to provide an extremely simple and highly efficient combined tire carrier and cover for use as an attachment for motor driven vehicles for carrying one or more extra tires.

To the above end, generally stated, the invention consists of the novel devices and combination of devices hereinafter described and defined in the claims.

In the accompanying drawings, which illustrate the invention, like characters indicate like parts throughout the several views.

Figure 1:
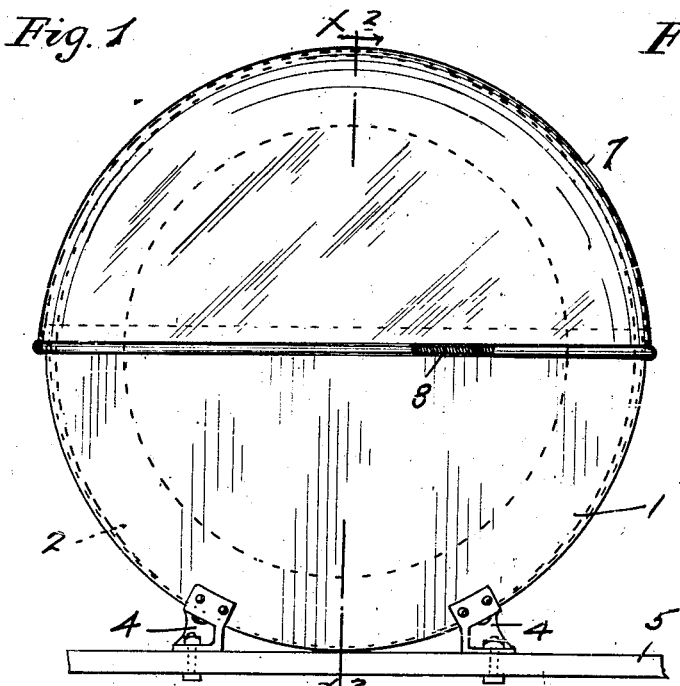
Figure 2:
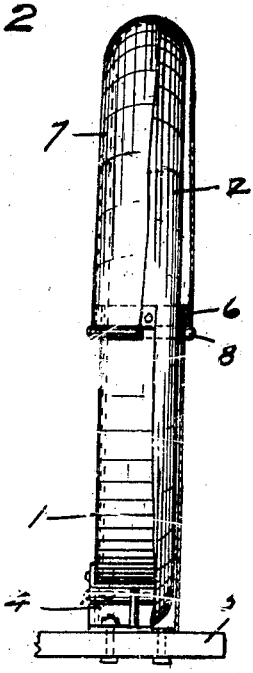
Figure 3:
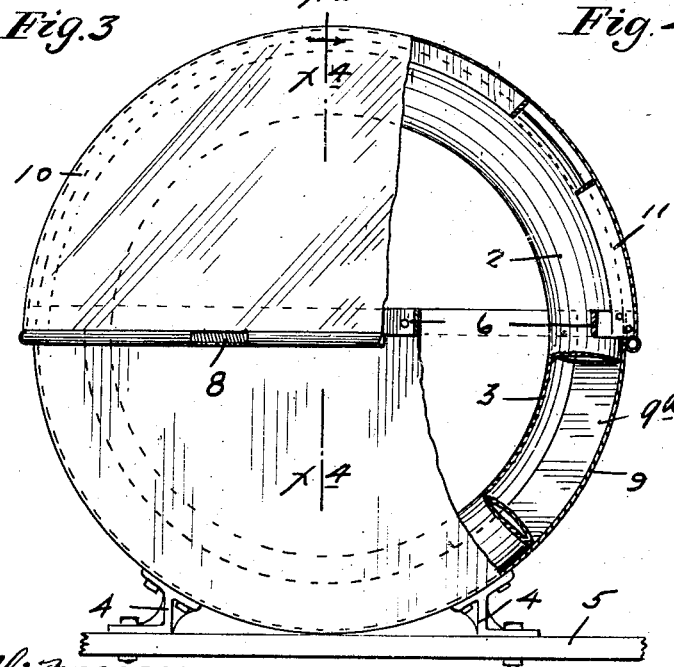
Figure 4:
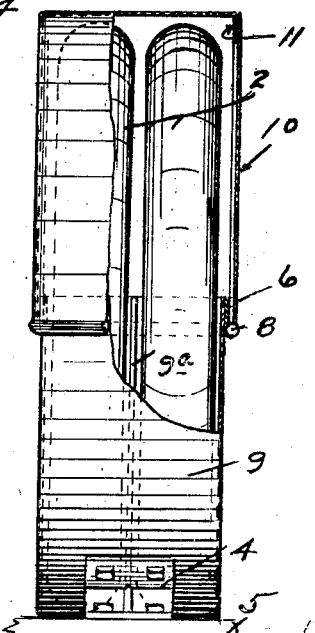

Referring to the drawings:—Figure 1 is a view in side elevation of the improved tire carrier and cover, mounted on the running board of an automobile, some parts being broken away and some parts being shown in section; Fig. 2 is a view, partly in elevation and partly in transverse vertical section taken on the line $x^2$-$x^2$ of Fig. 1; Fig. 3 is a view corresponding to Fig. 1, but showing the improved tire carrier and cover designed to carry two tires; Fig. 4 is a view, partly in elevation and partly in transverse vertical section taken on the line $x^4$ $x^4$ of Fig. 3; Figs. 5 and 6 are views corresponding to Figs. 1 and 2, respectively, but showing means for positively holding the tire, Fig. 7 is a detail view, partly in elevation and partly in transverse section, showing means for positively holding two tires in position; and Fig. 8 is a fragmentary view in side elevation of an automobile having the improved tire holder and cover, movably secured to the rear end portion thereof, some parts being indicated in different positions by means of broken lines.

Referring first to the construction, illustrated in Figs. 1 and 2, the numeral 1 indicates a sheet metal receptacle having an open top and semi-circular bottom. This receptacle 1 is adapted to receive the lower one-half of a pneumatic tire 2 and attached demountable wheel rim 3, for supporting the same in an upright position. The diameter of the receptacle 1 and its transverse rim is such, as to closely engage the tire 2 to prevent rotary or lateral movements thereof. Leg castings 4 are rigidly secured to the receptacle 1 and are bolted to the running board 5 of an automobile for supporting the receptacle 1 in an upright position. An endless band 6 is riveted to the outer face of the upper edge portion of the receptacle 1. This band 6 not only reinforces the receptacle 1, but affords means which assists in holding a cover 7 on the receptacle 1.

The cover 7 is of the same form as the receptacle 1, but is inverted with respect thereto. This cover 7 is placed over the tire 2 and its demountable rim 3 and telescoped onto the receptacle 1 over its reinforcing band 6. Preferably, the cover 7 is constructed from flexible material, suitably waterproof. A hem is formed in the lower edge of the cover 7 to receive an endless clamping band 8, as shown in the form of a coiled spring. This clamping band 8 draws the hemmed edge of the cover 7 onto the receptacle 1, just below the reinforcing band 6. Obviously, the reinforcing band 6 affords an endless shoulder, or stop flange, which prevents the cover 7 from working up and off from receptacle 1. By telescoping the cover 7 onto the receptacle 1 and yieldingly holding the same in position below the reinforcing band 6, a water and dust-proof joint is formed between the receptacle 1 and its cover 7.

The construction, shown in Figs. 3 and 4, is the same as that shown in Figs. 1 and 2, with the exception that the receptacle 9 and its cover 10 are made wide enough to receive and hold two tires in axial alinement. A longitudinal partition $9^a$ in the receptacle holds the tires laterally spaced. In the construction, illustrated in Figs. 1 and 2, the cover 7 rests directly on and is supported on the tire 3. While in the construction, illustrated in Figs. 3 and 4, the cover 10 is supported on a pair of laterally spaced arch bars 11. These arch bars 11 are rigidly secured, at their ends, to the reinforcing bar 6, at the sides of the receptacle 9, in order that the tire may be placed in the receptacle 9, or removed therefrom, between said arch bars. The arch bars 11, together with the receptacle 9, form a complete annular body. In place of the flat arch bars shown, it is, of course, understood that the same may be formed from bent rods.

Figs. 5 and 6 show a construction, substantially the same as that shown in Figs. 1 and 2, with the exception that the bottom of the receptacle 12 is segmental in cross section, and has secured to each of its sides, a pair of radially projecting legs 13, which are bolted to the running board 5 and support the receptacle 12 in an upright position. In this construction, there is also shown a device for positively holding the tire in the receptacle to prevent bouncing thereof, under the traveling movement of the automobile. This device comprises a buckle-equipped strap 14, anchored at its ends to the receptacle 12 and adapted to extend circumferentially over the tire. Permanently secured to the strap 14, is a plurality of longitudinally spaced segmental metal clips 15, which extend transversely over and embrace the tire to hold the strap 14 in position thereon.

Fig. 7 shows the strap 14 equipped with metal clips 16, designed to engage two axially alined tires, when carried, as shown in Figs. 3 and 4. In this arrangement, the strap 14 extends between the tires.

Fig. 8 shows the said tire carrier and cover, illustrated in Fig. 5, attached to the rear end portion of an automobile body 17, by a bracket 18. In this construction, the attachment extends transversely of the automobile and, when its cover 19 is down, the cover projects over said attachment.

As shown, the bracket 18 is formed in two parts, which parts are pivotally connected by a horizontal hinge pin. One member of the bracket 18 is rigidly secured to the receptacle 1 and the other member thereof, is rigidly secured to the rear end portion of the automobile body 17. The purpose of mounting the improved tire carrier and its cover with freedom for vertical swinging movement, is to attach the same close to the body of the automobile, and in case the top 19 thereof is down, said carrier may be moved from its normal upright position into an oblique position, as indicated by broken lines in Fig. 8. In the oblique position of the carrier, the tire may be inserted or removed from the carrier, without having to raise the top of the automobile. The bracket 18 is held in normal position and its pivotal movement is limited by a pair of vertically spaced extensions 20 and an eye bolt 21 equipped with a thumb nut 22. The bracket extensions 20 are integrally formed with the member of the bracket 18 on the receptacle 1 and the bolt 21 is pivoted to the member of the bracket 18 on the automobile body 17, by passing a horizontal pin through its eye. The bracket extensions 20 embrace the bracket member on the automobile body and the upper member thereof is provided with a slot to receive the eye bolt 21. By moving the thumb nut on the bolt 21 outward, said bolt may be moved out of engagement with the upper bracket extension 20 to allow the tire carrier to assume its oblique position, as indicated in dotted lines in Fig. 8. The lower bracket extension 20 affords a stop engageable with the member of the bracket 18 on the automobile body 17 for limiting the oblique position of the tire carrier. As is evident, it will be noted that the elastic or spring band interposed in the marginal hem of the flexible or collapsible upper case section provides the same with a beaded or flanged marginal edge portion that is both flexible and elastic.

What I claim is:—

1. The combination with a receptacle adapted to receive the lower portion of a tire and having a rigid upper marginal portion, of a cover for the upper portion of the tire having a flexible marginal edge of increased thickness adapted to be telescoped over the rigid marginal upper edge of said lower receptacle.

2. The combination with a rigid receptacle adapted to receive the lower portion of a tire and having a flanged upper marginal edge, a flexible tire cover having in its lower marginal edge an elastic clamping band adapted to be sprung over the flanged upper edge of said receptacle, and to normally hold said cover clamped to said receptacle.

3. The combination with a receptacle adapted to receive the lower portion of a tire, of a flexible tire cover having means for detachably securing the same to said receptacle, and means supported by said receptacle for preventing collapsing of said cover.

4. The combination with a receptacle adapted to receive the lower portion of a tire, of a flexible tire cover having means for detachably securing the same to said receptacle, said receptacle having arch bars for preventing the collapsing of said cover.

5. The combination with a rigid receptacle adapted to receive the lower portion of a tire, of a flexible and collapsible tire cover having means for detachably securing the same to said receptacle, the said receptacle having laterally spaced arch bars adapted to hold said collapsible cover extended against collapsing, and between which arch bars the tire is adapted to be passed into and out of said receptacle.

6. The combination with a receptacle adapted to receive the lower portion of a tire and having an outstanding reinforcing band, of a collapsible tire cover having in its lower marginal edge a flexible and elastic clamping band adapted to be sprung over the outstanding marginal reinforcing band of the lower tire receptacle.

In testimony whereof I affix my signature in presence of two witnesses.

EMIL R. DRAVER.

Witnesses:
CLARENCE C. SHOFER,
CHAS. D. STOKES.

Copies of this patent may be obtained for five cents each, by addressing the "Commissioner of Patents, Washington, D. C."